United States Patent
Hwang et al.

(10) Patent No.: US 7,704,616 B2
(45) Date of Patent: Apr. 27, 2010

(54) METHOD FOR PURGING FUEL CELL SYSTEM

(75) Inventors: Yong-Jun Hwang, Seoul (KR); Myung-Seok Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1021 days.

(21) Appl. No.: 11/431,675

(22) Filed: May 11, 2006

(65) Prior Publication Data

US 2007/0054161 A1 Mar. 8, 2007

(30) Foreign Application Priority Data

Sep. 5, 2005 (KR) .................... 10-2005-0082316

(51) Int. Cl.
*H01M 8/00* (2006.01)
*H01M 8/04* (2006.01)
*H01M 8/12* (2006.01)

(52) U.S. Cl. .................... 429/13; 429/12; 429/22

(58) Field of Classification Search .................... 429/13
See application file for complete search history.

(56) References Cited

U.S. PATENT DOCUMENTS

2002/0071975 A1  6/2002  Shimazu

2005/0233187 A1 * 10/2005 Pastula et al. ............... 429/13

FOREIGN PATENT DOCUMENTS

CA       2562716       * 10/2005

OTHER PUBLICATIONS

U.S. Appl. No. 11/431,674 to Hwang et al., filed on May 11, 2006.
U.S. Appl. No. 11/431,673 to Youk et al., filed on May 11, 2006.
U.S. Appl. No. 10/596,917 to Cho et al., filed on Jun. 29, 2006.
U.S. Appl. No. 10/596,919 to Cho et al., filed on Jun. 29, 2006.

* cited by examiner

*Primary Examiner*—Dah-Wei D Yuan
*Assistant Examiner*—Steven Scully
(74) *Attorney, Agent, or Firm*—KED & Associates, LLP

(57) ABSTRACT

A method for purging a fuel cell system comprises detecting a signal for stopping an operation of a fuel cell system, cutting off an electricity output of the fuel cell system, driving a steam generator of a fuel supply unit of the fuel cell system for a certain time and thereby generating steam, certifying whether a purging operation of the fuel cell system has been completed or not, and stopping the fuel cell system, in which the fuel cell system is purged by using steam generated by the steam generator. Since an additional container for storing nitrogen is not required, a fabrication cost is reduced. Also, inconvenience caused by periodically containing nitrogen in the container is solved. Furthermore, when the fuel cell system is used at home, an additional space for installing the nitrogen container is not required and the fuel cell system can be easily installed.

8 Claims, 3 Drawing Sheets

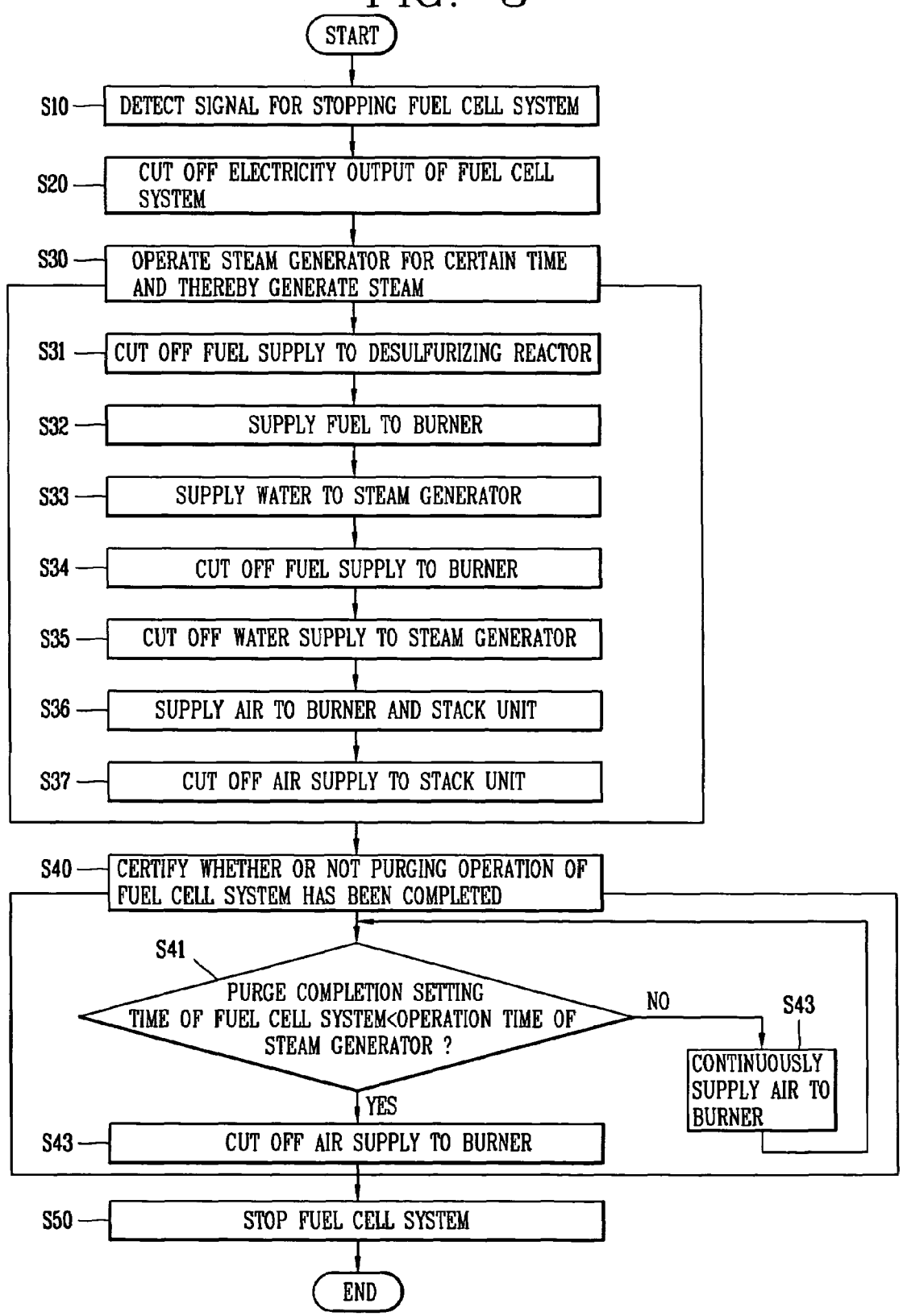

METHOD FOR PURGING FUEL CELL SYSTEM

BACKGROUND OF THE INVENTION

1. Field of the Invention

The present invention relates to a method for purging a fuel cell system, and more particularly, to a method for purging a fuel cell system capable of emitting combustible gas remaining in a fuel cell system outwardly at the time of stopping the fuel cell system.

2. Description of the Background Art

FIG. 1 is a schematic view showing a conventional fuel cell system of a proton exchange membrane fuel cell (PEMFC) method in which a hydrocarbon-based fuel such as LNG, LPG, $CH_3OH$, gasoline, etc. is used as a fuel by refining only hydrogen by a desulfurizing process, a reforming process, and a hydrogen refining process.

As shown, the conventional fuel cell system comprises a fuel supply unit 10 for supplying only hydrogen extracted from LNG to a stack unit 30, an air supply unit 20 for supplying air to the stack unit 30 and the fuel supply unit 10, and a stack unit 30 for generating electricity by supplied hydrogen and air.

As a fuel and steam perform a reforming process in the fuel supply unit 10, hydrogen is generated. In order to generate the steam, the fuel supply unit 10 is provided with a steam generator 10b and a burner 10a for supplying heat to the steam generator 10b.

In order to drive the burner 10a, a fuel is supplied to the burner 10a, and then off-gas remaining in the stack unit 30 after generating electricity is supplied to the burner 10a.

When a signal for stopping an operation of the fuel cell system is applied to the fuel cell system, combustible gas (methane, city gas, hydrogen, etc.) remaining in the fuel supply unit 10 and the stack unit 30 is purged by using nitrogen thereby to be exhausted outwardly.

However, in case of purging combustible gas by using nitrogen, an additional container for storing the nitrogen is required and thus a fabrication cost is increased. Also, when the nitrogen is used up, new nitrogen has to be periodically contained in the container. Furthermore, when the fuel cell system is used at home, there is a difficulty in obtaining an additional space for installing the nitrogen container.

BRIEF DESCRIPTION OF THE INVENTION

Therefore, an object of the present invention is to provide a method for purging a fuel cell system capable of purging a fuel cell system without using nitrogen.

To achieve these and other advantages and in accordance with the purpose of the present invention, as embodied and broadly described herein, there is provided a method for purging a fuel cell system, comprising: detecting a signal for stopping an operation of a fuel cell system; cutting off an electricity output of the fuel cell system; driving a steam generator of a fuel supply unit of the fuel cell system for a certain time and thereby generating steam; certifying whether a purging operation of the fuel cell system has been completed or not; and stopping the fuel cell system, in which the fuel cell system is purged by using steam generated by the steam generator.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flowchart showing a method for purging the fuel cell system of FIG. 2.

DETAILED DESCRIPTION OF THE INVENTION

Reference will now be made in detail to the preferred embodiments of the present invention, examples of which are illustrated in the accompanying drawings.

Hereinafter, a fuel cell system according to the present invention will be explained with reference to the attached drawings.

Figure 1:
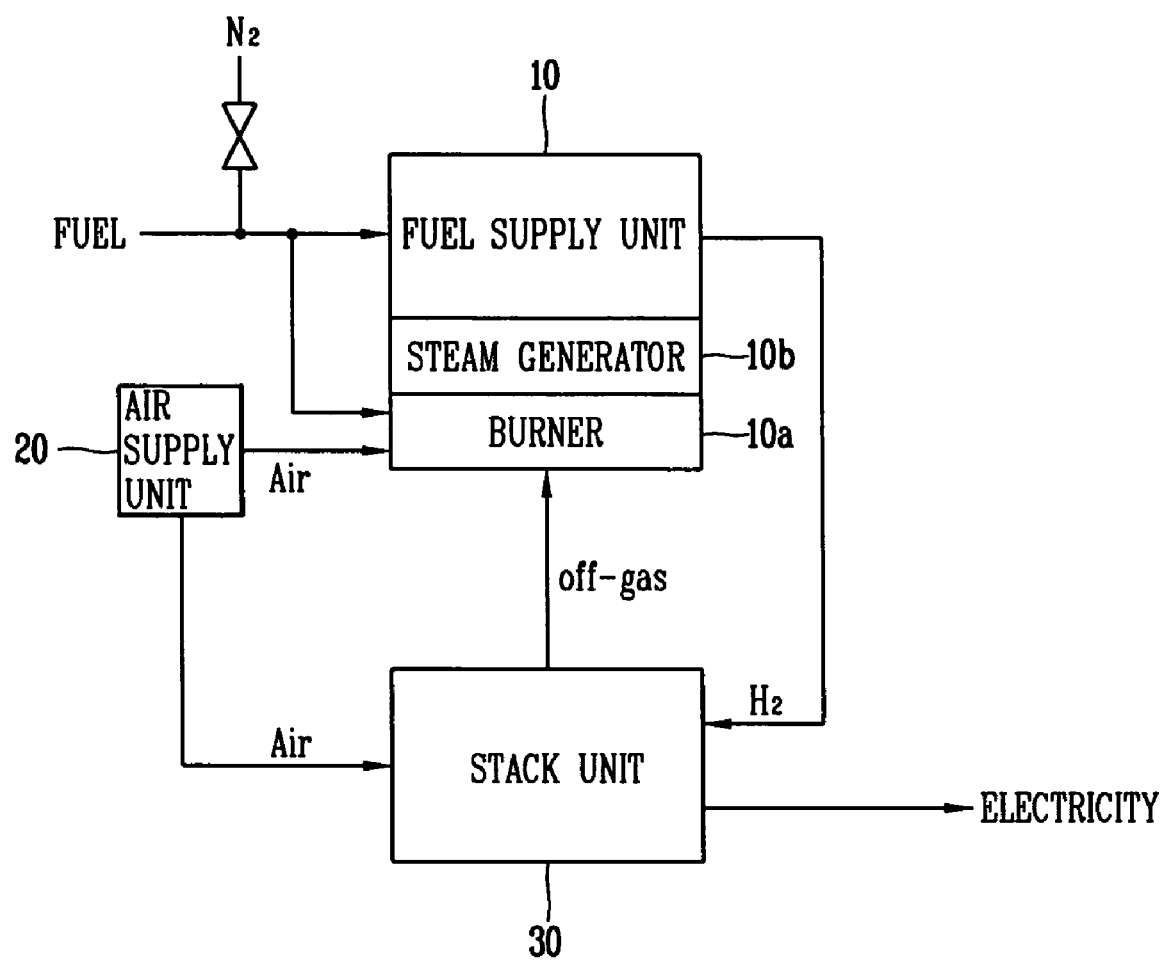
FIG. 1 is a schematic view showing a fuel cell system in accordance with the conventional art.
Figure 2:
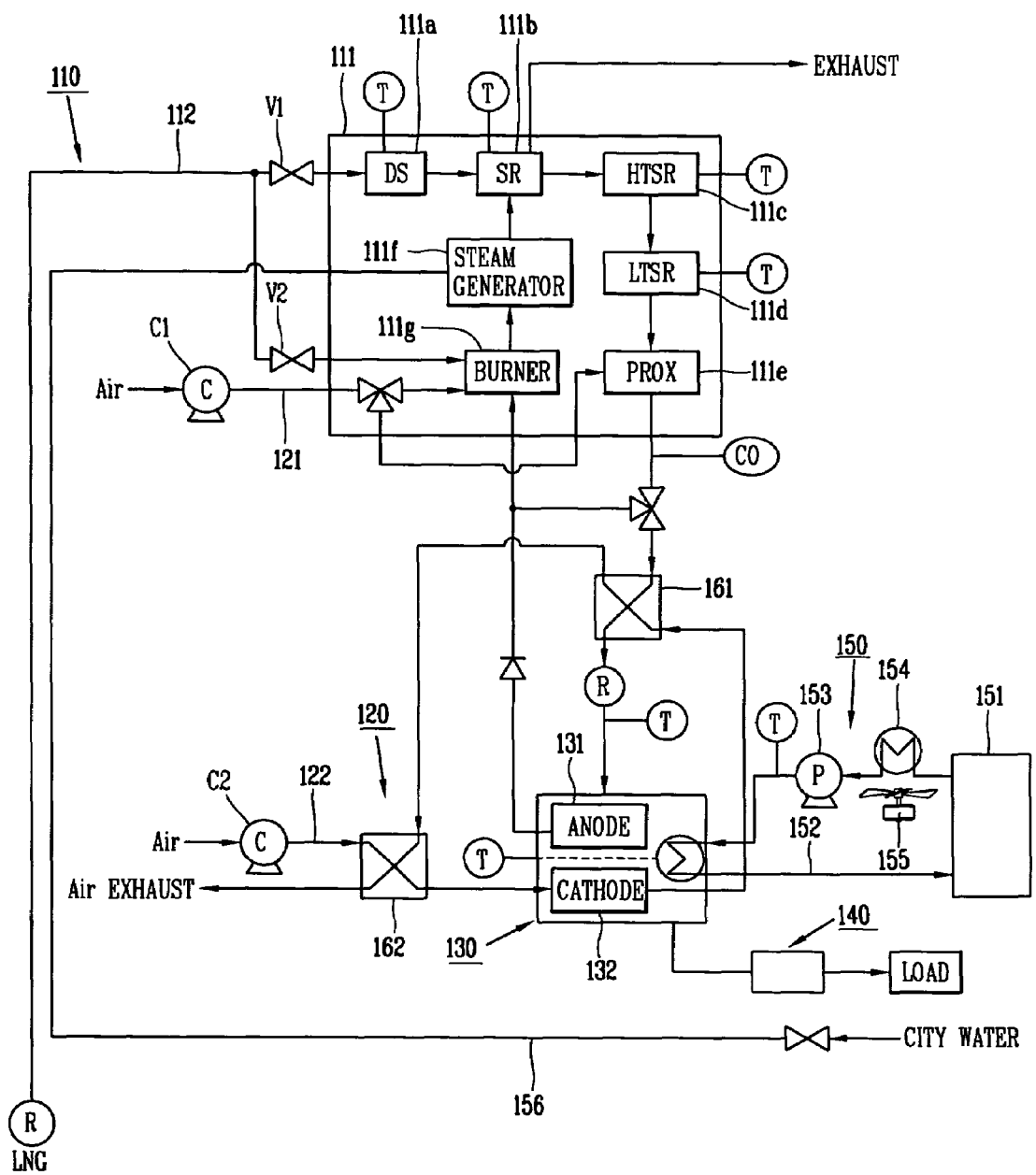
FIG. 2 is a diagram showing a fuel cell system according to the present invention.

FIG. 2 is a diagram showing a fuel cell system according to the present invention, and FIG. 3 is a flowchart showing a method for purging the fuel cell system of FIG. 2.

Referring to FIG. 2, the fuel cell system according to the present invention comprises a fuel supply unit 110, an air supply unit 120, a stack unit 130, an electricity output unit 140, and a water supply unit 150.

The fuel supply unit 110 for supplying hydrogen refined from LNG to the stack unit 130 comprises a reformer 111 and a fuel supply line 112.

The reformer 111 includes a desulfurizing reactor 111a for removing sulfur contained in a fuel, a steam reformer 111b for generating hydrogen by reforming a fuel and steam, a high temperature steam reformer 111c and a low temperature steam reformer 111d respectively for additionally generating hydrogen by re-acting carbon monoxide generated after passing through the steam reformer 111b, a partial oxidation reactor 111e for refining hydrogen by removing carbon monoxide included in a fuel by using air as a catalyst, a steam generator 111f for supplying steam to the steam reformer 111b, and a burner 111g for supplying heat to the steam generator 111f.

The fuel supply line 112 is provided with a first valve V1 for supplying a fuel to the desulfurizing reactor 111a or cutting off the fuel supply, and a second valve V2 for supplying a fuel to the burner 111g or cutting off the fuel supply.

The air supply unit 120 for supplying air to the fuel supply unit 110 and the stack unit 130 comprises a first compressor C1, a first supply line 121, a second compressor C2, and a second supply line 122. The first compressor C1 is connected to the burner 111g by the first supply line 121, and supplies air in the atmosphere to the burner 111g. The second compressor C2 is connected to the cathode 132 of the stack unit 120 via a second pre-heater 162 through the second supply line 122, and supplies air in the atmosphere to the cathode 1332 of the stack unit 120.

The stack unit 130 comprises the anode 131 and the cathode 132 so that electric energy and thermal energy can be simultaneously generated by an electro-chemical reaction between hydrogen supplied to the anode 131 from the fuel supply unit 10 and oxygen supplied from the air supply unit 120 to the cathode 132.

The electricity output unit 140 converts electric energy generated from the stack unit 130 into an alternating current, and then supplies the alternating current to a load.

The water supply unit 150 cools the reformer 111 and the stack unit 130, and supplies water to the steam generator 111f. The water supply unit 150 comprises a water supply container 151 for containing a certain amount of water, a water circulation line 152 for connecting the stack unit 130 and the water supply container 151 by a circulation method, a water circulation pump 153 installed in the middle of the water circulation line 152 and pumping the water inside the water supply container 151, a heat exchanger 154 and a blowing fan 155 installed in the middle of the water circulation line 152 for cooling supplied water, and a city water supply line 156 for supplying water or city water inside the water supply container 151 to the steam generator 111f.

The city water supply line 156 is provided with a third valve V3 for supplying city water to the steam generator 111f or cutting off the fuel supply.

Hereinafter, the method for purging a fuel cell system will be explained with reference to FIGS. 2 and 3.

The method for purging a fuel cell system comprises detecting a signal for stopping an operation of a fuel cell system (S10), cutting off an electricity output of the fuel cell system (S20), driving a steam generator 111f of a fuel supply unit 110 for a certain time and thereby generating steam (S30), certifying whether a purging operation of the fuel cell system has been completed or not (S40), and stopping the fuel cell system (S50). According to the method, the fuel cell system is purged by using steam generated by the steam generator 111f without using nitrogen.

The step of driving the steam generator 111f of the fuel supply unit 110 for a certain time comprises cutting off a fuel supply to the desulfurizing reactor 111a of the fuel supply unit 110 by closing the first valve V1 (S31), supplying a fuel to the burner 111g of the fuel supply unit 110 by opening the second valve V2 (S32), supplying city water to the steam generator 111f by opening the third valve V3 (S33), cutting off the fuel supply to the burner 111g of the fuel supply unit 110 by closing the first valve V1 (S34), cutting off the city water supply to the steam generator 111f by closing the third valve V3 (S35), respectively supplying air to the burner 111g and the stack unit 120 by operating the first compressor C1 and the second compressor C2 of the air supply unit 120 (S36), and cutting off the air supply to the stack unit 120 by stopping the second compressor C2 (S37).

In order to enhance an efficiency of a purging operation and minimize time taken to drive the fuel cell system after detecting a signal for stopping the fuel cell system, city water is preferably supplied to the steam generator 111f for 1~3 minutes. Also, air is preferably supplied to the burner 111g and the stack unit 120 for 1~3 minutes.

The step of certifying whether a purging operation of the fuel cell system has been completed or not (S40) comprises comparing a purge completion setting time (Tset) of the fuel cell system with an operation time (T) of the steam generator 111f (S41), driving the first compressor C1 and thereby continuously supplying air to the burner 111g when the operation time (T) is smaller than the purge completion setting time (Tset) (S42), and stopping the first compressor C1 and thereby cutting off the air supply air to the burner 111g when the operation time (T) is larger than the purge completion setting time (Tset) (S43).

According to the method for purging a fuel cell system according to a first embodiment of the present invention, the fuel cell system is purged by using steam without using nitrogen. As the result, an additional container for storing nitrogen is not required, and thus a fabrication cost is reduced. Also, inconvenience caused by periodically containing nitrogen in the container when the nitrogen is used up can be solved. Furthermore, when the fuel cell system is used at home, an additional space for installing the nitrogen container is not required and the fuel cell system can be easily installed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for purging a fuel cell system, comprising:
   detecting a signal for stopping an operation of a fuel cell system;
   cutting off an electricity output of the fuel cell system;
   driving a steam generator of a fuel supply unit of the fuel cell system for a certain time and thereby generating steam;
   certifying whether a purging operation of the fuel cell system has been completed or not; and
   stopping the fuel cell system, in which the fuel cell system is purged by using steam generated by the steam generator,
   wherein driving the steam generator for a certain time and thereby generating steam includes:
   supplying a fuel to a burner of the fuel supply unit,
   supplying city water to the steam generator,
   cutting off the fuel supply to the burner, and
   cutting off the city water supply to the steam generator.

2. The method of claim 1, wherein a time taken to supply the city water to the steam generator is within a range of 1~3 minutes.

3. The method of claim 1, wherein certifying whether a purging operation of the fuel cell system has been completed or not comprises:
   comparing a purge completion setting time of the fuel cell system with an operation time of the steam generator;
   continuously supplying air to the burner when the operation time is smaller than the purge completion setting time; and
   cutting off the air supply air to the burner when the operation time is larger than the purge completion setting time.

4. The method of claim 3, wherein a time taken to supply air to the burner is within a range of 1~3 minutes.

5. A method for purging a fuel cell system, comprising:
   detecting a signal for stopping an operation of a fuel cell system;
   driving a steam generator of a fuel supply unit of the fuel cell system for a certain time and thereby generating steam;
   purging the fuel cell system by using steam generated by the steam generator; and
   stopping the fuel cell system,
   wherein driving the steam generator for a certain time and thereby generating steam includes:
   supplying a fuel to a burner of the fuel supply unit,
   supplying city water to the steam generator,
   cutting off the fuel supply to the burner, and
   cutting off the city water supply to the steam generator.

6. The method of claim 5, wherein a time taken to supply the city water to the steam generator is within a range of 1~3 minutes.

7. The method of claim 5, wherein purging the fuel cell system comprises:
   comparing a purge completion setting time of the fuel cell system with an operation time of the steam generator;
   continuously supplying air to the burner when the operation time is smaller than the purge completion setting time; and
   cutting off the air supply air to the burner when the operation time is larger than the purge completion setting time.

8. The method of claim 7, wherein a time taken to supply air to the burner is within a range of 1~3 minutes.

* * * * *